(12) United States Patent  (10) Patent No.: US 6,618,258 B2
Goris                     (45) Date of Patent:    Sep. 9, 2003

(54) PORTABLE MEMORY CARD SYSTEM

(75) Inventor: Andrew C Goris, Loveland, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 0 days.

(21) Appl. No.: 09/853,729

(22) Filed: May 10, 2001

(65) Prior Publication Data

US 2002/0167791 A1 Nov. 14, 2002

(51) Int. Cl.[7] ............................. H05K 5/02; H05K 7/18
(52) U.S. Cl. ..................... 361/737; 361/728; 361/729; 361/730; 361/736; 361/752
(58) Field of Search ................................ 361/728–731, 361/736–737, 788, 796, 752; 235/493

(56) References Cited

U.S. PATENT DOCUMENTS 5,036,429 A  *  7/1991  Kaneda et al. .............. 361/392
5,664,228 A  *  9/1997  Mital ........................ 395/882
5,883,377 A  *  3/1999  Chapin, Jr. ................. 235/493
6,276,608 B1 *  8/2001  Cockayne et al. .......... 235/492

* cited by examiner

*Primary Examiner*—David Martin
*Assistant Examiner*—Dameon E. Levi

(57) ABSTRACT

Portable memory storage cards can be stacked together in a receiver that also serves as a player, allowing for compact and efficient storage and usage of those cards. The portable memory storage cards have at least one contact on both sides, positioned such that the cards are reversible. A receiver for the cards also serves as the player. A set of contacts is provided at one end of a storage cavity, into which an arbitrarily large number of cards may be stacked together, such that their contacts touch to form a bus. The stacked cards are biased against the set of contacts to establish physical contact between the set of contacts in the storage cavity and contacts on the adjacent card. The cards each include at least one alignment guide to restrict the motion of adjacent cards relative to one another when cards are stored in the cavity of the receiver.

26 Claims, 3 Drawing Sheets

PORTABLE MEMORY CARD SYSTEM

FIELD OF THE INVENTION

This invention relates to data storage, and more particularly to portable memory storage cards utilized for storage and playback of data.

BACKGROUND

Many people have collections of compact disks, videotapes, game software cartridges or disks, DVDs, laserdiscs, and other media on which movies, music, games, software, or other content is stored. As these collections grow, finding space for them often becomes a challenge. Additionally, different media typically require different players, which take up space, and can be costly to purchase. Most such players have moving parts and complex circuitry. Further, the number of moving parts, and the consequent risk of malfunction, often increase as the number of discrete media items that a player can accept increases. For example, some DVD players can receive two separate DVDs, where each DVD is placed into a separate tray with a separate drive mechanism. By doubling the number of mechanisms in the player, the reliability of the player is decreased and its cost is increased. As another example, some compact disc players allow for the insertion of multiple compact discs using a variety of mechanisms. However, these mechanisms each must mechanically position a particular disc at a particular drive location having a hub and a laser in order to play the disc, and then move the disc out of that position when another disc is to be played.

To reduce the size of media, smaller memory storage devices have been developed. Such memory storage devices include flash memory cards, PCMCIA cards, Smart Media cards, Secure Digital cards, the MMC (Multi-Media) Card, and Sony's Memory Stick. Although these memory storage devices may be smaller than previous devices, they are still difficult to organize and store. Indeed, the small size of these memory storage devices makes them more likely to be misplaced or lost.

SUMMARY

Portable memory storage cards with contacts on each side can be stacked together in a receiver through which information stored in the cards may be accessed, allowing for compact and efficient storage and usage of those cards.

In one aspect of the invention, a portable memory storage card has contacts on both sides, such that the card is reversible. The memory storage card is adapted to store audio, video, software, or other content.

In another aspect of the invention, a receiver for the cards also serves as a device allowing for access to information stored within the cards. A set of contacts is provided at one end of a storage cavity, into which an arbitrarily large number of cards may be stacked together, such that their contacts touch to form a bus. The stacked cards are biased against the set of contacts to establish physical contact between the set of contacts in the storage cavity and contacts on the adjacent card. The ability to connect the cards together by contact with adjacent cards simplifies data access from the cards. Because contacts are provided on both sides of the cards, the cards may be arbitrarily thick, and need not all have the same thickness. Data travels along the bus formed by the cards and through at least one contact in the cavity. The receiver thus doubles as a player, such that a separate player is not required for accessing the content stored on the cards. Further, because the cards do not need to be moved out of the receiver to be played, they are less likely to be lost or misplaced during normal use.

In another aspect of the invention, the cards each include at least one alignment guide. By restricting the motion of adjacent cards relative to one another when cards are stored in the cavity of the receiver, the alignment guides help to ensure alignment of contacts between adjacent cards.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figures 1, 2, 3:
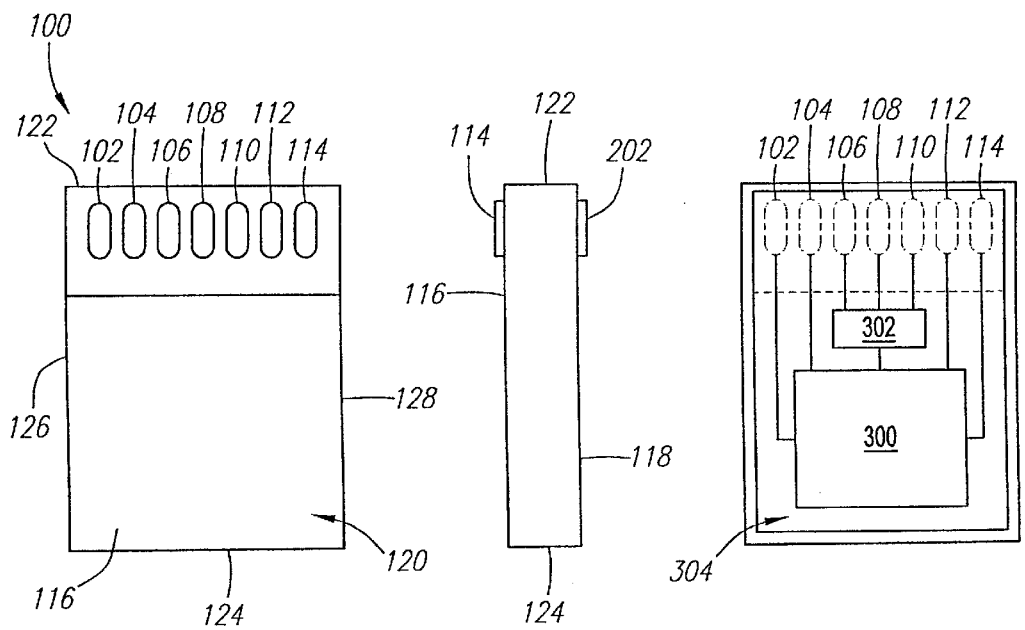
FIG. 1 is a front view of a portable memory storage card.
FIG. 2 is a side view of the portable memory storage card.
FIG. 3 is a cutaway block diagram of the portable memory storage card.

Referring to FIGS. 1–3, a portable memory storage card 100 is shown. In one embodiment, the portable memory storage card 100 has a substantially box-shaped body 120 with a substantially hollow interior 304. The body 120 of the portable memory storage card 100 has a first face 116 and a second face 118 having substantially the same surface area, and positioned on the body 120 opposite from and substantially parallel to one another. The first face 116 and the second face 118 have the largest surface areas on the body 120. The first face 116 and the second face 118 are connected by a top surface 122 and a bottom surface 124, as well as a left side surface 126 and a right side surface 128, each of which is positioned at substantially a right angle to both the first face 116 and the second face 118. The top surface 122 and the bottom surface 124 both have substantially the same surface area, and are positioned on the body 120 opposite from and substantially parallel to one another. Further, the left side surface 126 and the right side surface 128 both have substantially the same surface area, and are positioned on the body 120 opposite from and substantially parallel to one another.

The body 120 of the portable memory storage card 100 may be constructed from any substantially rigid and durable material, or combination of such materials. In one embodiment, the body 120 is substantially nonconductive. The body 120 may be constructed from plastic, polycarbonate, ceramic, or one or more other appropriate materials. The particular material composition of the body 120 is not critical to the invention.

A memory storage unit 300 is located within the hollow interior 304 of the body 120. The memory storage unit 300 may be any type of device, or combination of devices, capable of storing data. For example, the memory storage unit 300 may be solid-state memory, a rewriteable optical drive, a read-only optical drive, or other device. In one embodiment, the memory storage unit 300 is read-only, meaning that the memory storage unit 300 is adapted to receive data written to it only once, after which data can only be read out of the memory storage unit 300. In another embodiment, the memory storage unit 300 is rewriteable, meaning that data can be written to it multiple times, in addition to or in place of any data already present in the memory storage unit 300. The particular device used as the memory storage unit 300 is not critical to the invention.

In one embodiment, an electrical interface module 302 is electrically connected to the memory storage unit 300. In one embodiment, the electrical interface module 302 includes a buffer, which is an application-specific integrated circuit (ASIC), field-programmable gate array (FPGA), or other such device. The buffer may include, or be electrically connected to, memory that is separate from the memory storage unit 300. In another embodiment, the buffer is included as a part of the memory storage unit 300. A buffer between a bus and memory, such as the memory storage unit 300 is standard in the art. The electrical interface module 302 may include another circuit and/or perform different or additional functions. For example, the electrical interface module 302 may include a register, a voltage protector, a power supply, a processor, a bus controller, encryption logic, authentication logic, or other logic. Further, multiple electrical interface modules 302 may be provided to perform different functions.

A number of contacts 102–114 are provided on the first face 116 of the portable memory storage card 100. More or fewer contacts may be provided, if desired. Collectively, the set of contacts 102–114 may be referred to as a connector, as is standard terminology in the art. In one embodiment, a first contact 102, a second contact 104, a third contact 112 and a fourth contact 114 are electrically connected to the electrical interface module 302 via traces, wires or other conductors. The first contact 102, second contact 104, third contact 112 and fourth contact 114 are collectively referred to as the data contacts 102, 104, 112, 114, and carry data into and/or out of the portable memory storage card 100. A fifth contact 106 and a sixth contact 110 are electrically connected to the memory storage unit 300 via traces, wires or other conductors. The fifth contact 106 and the sixth contact 110 are collectively referred to as the power contacts 106, 110, and carry power to the circuitry within the portable memory storage card 100. The power contacts 106, 110 may also or instead be connected to the electrical interface module 302, or the electrical interface module 302 may receive power via the memory storage unit 300. A seventh contact 108 is electrically connected to the memory storage unit 300 via a trace, wire or another conductor. The seventh contact 108 is the ground contact, which provides a ground to the portable memory storage card 100. The ground contact 108 may be connected to the memory storage unit 300, the electrical interface module 302, or both.

In one embodiment, each contact 102–114 on the first face 116 is a contact pad. Such contact pads are metallized areas on the first face 116 that provide contact points between metal traces or wires inside the portable memory storage card 100 and external circuitry, and are standard in the art. The contact pads may extend slightly above the surface of the first face 116, to improve the connection between those contact pads and contact pads on an adjacent portable memory storage card 100, as explained in greater detail below. The contact pads may instead be substantially flush with the surface of the first face 116, if desired.

In another embodiment, each contact 102–114 is a metal plate, bar, leaf, leaf spring, or other substantially flat conductor. The contacts 102–114 each maybe a spring, or coupled to a spring (not shown) within the body 120. Each contact 102–114 may be coupled to an individual spring, or two or more of the contacts 102–114 may be connected to the same spring. In this embodiment, each contact 102–114 is biased outward from the body 120 of the portable memory storage device 100. Each contact 102–114 can thus move when placed against an external surface, such that each contact 102–114 can flex back toward the body. This flexibility may allow the contacts 102–114 to flex to a position in which the surfaces of the contacts 102–114 are substantially flush with the first face 116. In this way, the contacts 102–114 do not interfere with the ability to stack together a number of individual portable memory storage devices 100, as described in greater detail below.

In one embodiment, the contacts 102–114 are arranged symmetrically on the first face 116. As one example of symmetry, the ground contact 108 is located at the center of a row of contacts 102–114. One power contact 106 is located on one side of the ground contact 108, and the other power contact 110 is located on the opposite side of the ground contact 108. Two data contacts 102, 104 are located adjacent one power contact 106, and the other data contacts 112, 114 are located adjacent the other power contact 110. In this way, the contacts 102–114 form a row having bilateral symmetry.

The contacts 102–114 need not be arranged in the particular order described here in order to be symmetrical; other configurations of the contacts 102–114 may be utilized if desired. Further, the contacts 102–114 need not be arranged in a row to possess bilateral symmetry. For example, the contacts 102–114 may be staggered relative to a horizontal line, while retaining bilateral symmetry. In another embodiment, the contacts 102–114 may be arranged in a configuration having radial symmetry, rather than bilateral symmetry. As an example of one radially symmetrical configuration, the contacts 102–114 may be arranged along the perimeter of a circle.

The second face 118 of the body 120 of the portable memory storage device 100 also includes a number of contacts 202–214. The properties of the contacts 202–214 on the second face 118 are substantially the same as described above with regard to the contacts 102–114 on the first face 116. The same number of contacts 202–214 is provided on the second face 118 as on the first face 116. In one embodiment, on the second face 118 a first contact 202, a second contact 204, a third contact 212 and a fourth contact 214 are electrically connected to the electrical interface module 302 via traces, wires or other conductors. The first contact 202, second contact 204, third contact 212 and fourth contact 214 are collectively referred to as the data contacts 202, 204, 212, 214, and carry data into and/or out of the portable memory storage card 100. A fifth contact 206 and a sixth contact 210 are electrically connected to the memory storage unit 300 via traces, wires or other conductors. The fifth contact 206 and the sixth contact 210 are collectively referred to as the power contacts 206, 210, and carry power to the circuitry within the portable memory storage card 100. The power contacts 206, 210 may also or instead be connected to the electrical interface module 302, or the electrical interface module 302 may receive power via the memory storage unit 300. A seventh contact 208 is electrically connected to the memory storage unit 300 via a trace, wire or another conductors. The seventh contact 208 is the ground contact, which provides a ground to the portable memory storage card 100. The ground contact 208 may be connected to the memory storage unit 300, the electrical interface module 302, or both. The contacts 202–214 maybe arranged on the second face 118 in alternate configurations, as described above with regard to other configurations of contacts 102–114 on the first face 116.

In one embodiment, the contacts 202–214 are arranged symmetrically on the second face 118 such that they have the same symmetry relative to one another as the contacts 102–114 on the first face 116 of the body 120. The contacts 202–214 are also positioned on the second face 118 in the same manner as the contacts 102–114 are positioned on the first face 116. As a result, the portable memory storage card 100 is rotationally symmetrical. That is, the portable memory storage card 100 is symmetrical about its centerline that extends parallel to its first face 116 and second face 118 and perpendicular to top surface 122 and a bottom surface 124, such that the card 100 is symmetrical when rotated substantially 180 degrees around that centerline. As a result, the first face 116 and the second face 118 each have the same configuration when viewed externally. Thus, absent identifying marks or other sensory cues, the first face 116 is indistinguishable from the second face 118. Thus, the portable memory storage card 100 can be inserted into a receiver in either of two separate orientations, as described in greater detail below.

In another embodiment, the contacts 102–114 and the contacts 202–214 are not arranged symmetrically, such that the portable memory storage card 100 is not reversible. Sensory cues such as visual markings, registration features, or the like may be used to distinguish the first face 116 from the second face 118 of such portable memory storage cards 100. In such an embodiment, the contacts 102–114 may be raised and the contacts 202–214 may be depressed, or vice versa. For example, the contacts 102–114 may be raised relative to the surface of the first face 116 and convex, and the corresponding contacts 202–214 maybe depressed relative to the surface of the second face 118 and concave. In this way, the contacts 102–114, 202–214 themselves assist in aligning adjacent cards 100 with one another.

Figure 4:
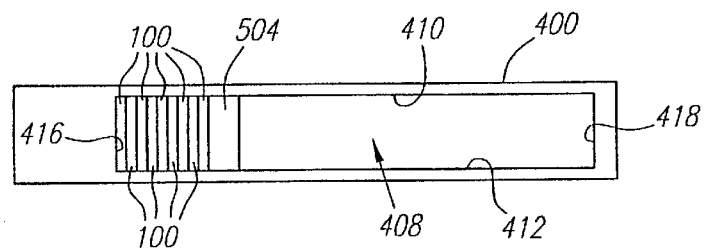
FIG. 4 is a front view of a receiver, with several portable memory storage cards stacked therein.
Figures 5, 5A:
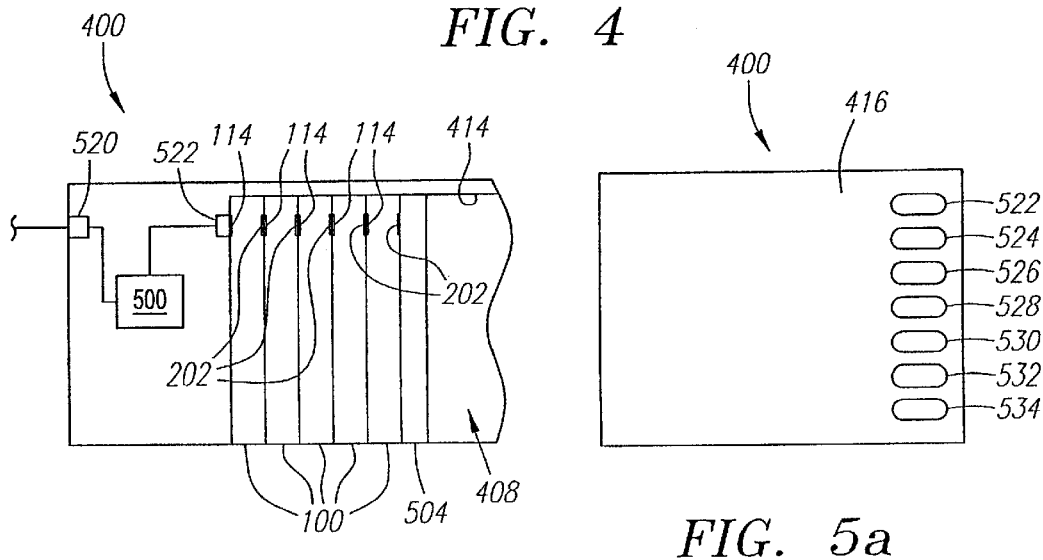
FIG. 5 is a top cutaway view of the receiver, with several portable memory storage cards stacked therein.
FIG. 5A is a side view of a wall of a cavity within the receiver, showing the connector within the receiver.
Figure 6:
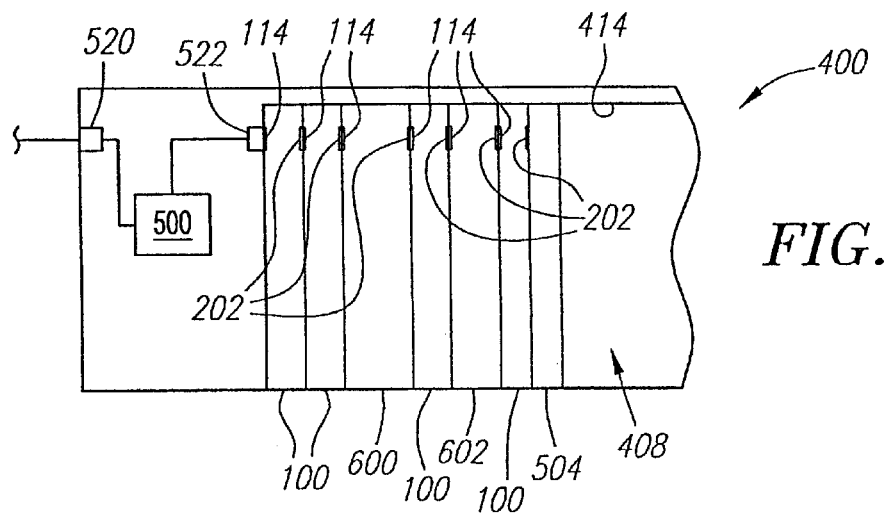
FIG. 6 is a top cutaway view of the receiver, with several portable memory storage cards of different thicknesses stacked therein.

Referring as well to FIGS. 4–6, a receiver 400 for receiving a number of portable memory storage cards 100 is shown. The receiver 400 includes a cavity 408 sized to accommodate a number of portable memory storage cards 100. In one embodiment, the cavity 408 is defined by an upper surface 410, a lower surface 412 substantially parallel to the upper surface 410, a rear surface 414 connected to and substantially perpendicular to both the upper surface 410 and the lower surface 412, a first wall 416 connected to and substantially perpendicular to one end of the upper surface 410, the lower surface 412, and the rear surface 414, and a second wall 418 substantially parallel to the first wall 416, and connected to the other end of the upper surface 410, the lower surface 412 and the rear surface 414. The cavity 408 is sized such that a portable memory storage card 100 can be inserted into the cavity 408, where the left surface 126 of the card 100 substantially contacts the lower surface 412 of the cavity 408, the right surface 128 of the card 100 substantially contacts the upper surface 410 of the cavity 408, and the top surface 122 of the card 100 contacts the rear surface 414 of the cavity 408. However, adequate clearance is provided to allow the card 100 to easily slide into and out of the cavity 408.

The cavity 408 is adapted to hold a number of cards 100. The first card 100 inserted into the cavity 408 is positioned with its first face 116 or its second face 118 adjacent the first wall 416 and its top surface 122 adjacent the rear surface 414 of the cavity 408. The first wall 416 includes a number of receiver contacts 522–534, which collectively may be referred to as a receiver connector. In one embodiment, the same number of receiver contacts 522–534 are provided as the number of contacts on each card 100. Further, the receiver contacts 522–534 are positioned relative to one another, and relative to the card 100, such that when the first face 116 is adjacent the first wall 416 each contact 102–114 is in contact with a corresponding receiver contact 522–534. For example, when the first face 116 of the card 100 is positioned adjacent the first wall 416, the first contact 102 of the card 100 is in contact with a first receiver contact 534, the second contact 104 of the card 100 is in contact with a second receiver contact 532, the third contact 112 of the card 100 is in contact with a third receiver contact 524, and the fourth contact 114 of the card 100 is in contact with a fourth receiver contact 522. Thus, data travels between the card 100 and the receiver 400 via the card data contacts 102, 104, 112, 114 and the receiver data contacts 522, 524, 532, 534. Similarly, the fifth contact 106 of the card 100 is in contact with a fifth receiver contact 530, and the sixth contact 110 of the card 100 is in contact with a sixth receiver contact 526. Thus, current travels between the card 100 and the receiver 400 via the card power contacts 106, 110 and the receiver power contacts 526, 530. Further, the seventh contact 108 of the card 100 is in contact with a seventh receiver contact 528. Thus, a common ground is established between the card ground contact 108 and the receiver ground contact 528.

The second face 118 instead may be placed adjacent the first wall 416, due to the rotational symmetry of the card 100. The receiver contacts 522–534 are positioned relative to one another, and relative to the card 100, such that when the second face 118 is adjacent the first wall 416 each contact 202–214 is in contact with a corresponding receiver contact 522–534. The connections between the contacts 202214 on the second face 118 and the contacts 522–534 on the first wall 416 are made as described above with regard to the first face 116.

In one embodiment, the receiver contacts 522–534 are contact pads, as described above with regard to the card 100. In another embodiment, each contact 522–534 is a metal plate, bar, leaf, leaf spring, or other substantially flat conductor. The contacts 522–534 each may be a spring, or coupled to a spring (not shown) within the receiver 400. Each contact 522–534 may be coupled to an individual spring, or two or more of the contacts 522–534 may be connected to the same spring. In this embodiment, each contact 522–534 is biased outward from the first wall 416. Each contact 522–534 can thus move when a card 100 is placed adjacent to the first wall 416, such that each contact 522–534 can flex back toward the first wall. This flexibility may allow the contacts 102–114 to flex to a position where the surfaces of the contacts 202–214 are substantially flush with the second face 118. Other types of receiver contacts 522–534 may be used, if desired. The receiver contacts 522–534 need not be identical to the types of card contacts 102–114, 202–214 described above, as long as the receiver contacts 522–534 are capable of creating and maintaining an electrical connection to the card 100.

A retainer 504 is located in the cavity 408. The retainer 504 is positioned such that any cards 100 in the cavity 408 are located between the retainer 504 and the first wall 416. The retainer 504 is biased toward the first wall 416, such that any cards 100 between the retainer 504 and the first wall 416 are pressed together, and the particular card 100 adjacent the first wall 416 is pressed against the first wall 416. The biasing force applied by the retainer 504 is substantially perpendicular to the first wall 416. The retainer 504 may be any substantially rigid structure capable of pressing against a card 100. The mechanism by which a retainer 504 is biased toward the first wall 416 is standard. For example, in one embodiment, the retainer 504 is spring-loaded. The particular biasing mechanism used is not critical to the invention.

Whether one or more cards 100 are present in the cavity 408, the card 100 adjacent the first wall 416 is pressed into the first wall 416 by the biasing action of the retainer 504. In this example, the first face 116 of the card 100 is oriented such that it faces the first wall 416 and is pressed into contact with it, and the card 100 is positioned such that its top surface 112 is in contact with the rear surface 414 of the cavity 408. As a result, the contacts 102–114 of the card 100 engage the contacts 522–534 on the first wall 416 such that electrical connection is made between the contacts 102–114 on the card 100 and the contacts 522–534 on the first wall 416. The contacts 102–114 on the card 100 need not be the same type as the contacts 522–534 on the first wall 416. In one embodiment, the contacts 102–114 on the card 100 are contact pads, as are the contacts 522–534 on the first wall 416. The retainer 504 presses the card 100 against the first wall 416, thereby pressing the contact pads 102–114 on the card 100 against the contact pads 522–534 on the first wall 416 to establish an electrical connection between them. In another embodiment, the contacts 102–114 on the card 100 are conductors having relatively flat surfaces, where each contact 102–114 is coupled to a spring biasing the conductor outward from the card 100. Similarly, the contacts 522–534 on the first wall 416 are conductors having relatively flat surfaces, where each contact 522–534 is coupled to a spring biasing the conductor outward from the first wall 416. The retainer 504 presses the card 100 against the first wall 416, thereby engaging the contacts 102–114 with the corresponding contacts 522–534. The contacts 102–114 on the card 100 flex as the card 100 seats against the first wall 416 and the contacts 102–114 on the card 100 are pressed against the contacts 522–534 on the first wall 416. Similarly, the contacts 522–534 on the first wall flex as well. The contacts 102–114 may stop in a position substantially flush with the body 120 of the card, and the contacts 522–534 may stop in a position substantially flush with the first wall 416. In another embodiment, the contacts 102–114 on the card 100 are conductors having relatively flat surfaces, where each contact 102–114 is coupled to a spring biasing the conductor outward from the card 100. The contacts 522–534 on the first wall 416 are contact pads. The retainer 504 presses the card 100 against the first wall 416, thereby engaging the contacts 102–114 with the corresponding contacts 522–534. The contacts 102–114 on the card 100 flex back as the card 100 seats against the first wall 416 and the contacts 102–114 on the card 100 are pressed against the contact pads 522–534 on the first wall 416. In another embodiment, the contacts 102–114 on the card 100 are contact pads, and the contacts 522–534 on the first wall 416 are conductors having relatively flat surfaces, where each contact 522–534 is coupled to a spring biasing the conductor outward from the first wall 416. The contacts 522–534 on the first wall 416 flex back as the card 100 seats against the first wall 416 and the contact pads 102–114 on the card 100 are pressed against the contacts 522–534 on the card 100.

In one embodiment, multiple portable memory storage cards 100 may be received into the cavity 408. These cards 100 are received into the cavity 408 between the first wall 416 and the retainer 504. The retainer 504, which is biased toward the first wall 416, presses the cards 100 against one another, such that a face of one card 100 is pressed against the first wall 416. The group of cards 100 pressed together within the cavity 408 may be referred to as a stack. The cards 100 are arranged in the cavity 408 such that the contacts 102–114, 202–214 on each card 100 are substantially aligned with, and substantially engage, connectors on each adjacent card 100, with the exception of the cards 100 at each end of the stack. That is, each card 100 is inserted into the cavity 408 such that its top surface 122 contacts the rear surface 414 of the cavity, and because each card 100 is rotationally symmetrical and has contacts 102–114, 202–214 arranged in the same configuration, contacts on adjacent cards 100 will line up. The contacts on the card 100 on the face adjacent the first wall 416 connect to the contacts 522–534 on the first wall 416, as described above. In one embodiment, the retainer 504 may include contacts adapted to electrically connect to the contacts on the face of the card 100 adjacent the retainer 504, such that data and/or power can travel through the retainer 504. In another embodiment, the retainer 504 serves a mechanical function, not an electrical function, such that the retainer 504 does not include contacts. In another embodiment, the retainer 504 may include one or more bus terminators (not shown) adapted to contact the data contacts on the face of the card 100 in contact with the retainer 504. The retainer 504 may include other electrical components, or provide other functions, adapted to enhance the functioning of the stack.

In another embodiment, each card 100 is rotationally symmetrical about a second centerline parallel to the first face 116 and second face 118 and perpendicular to the left side surface 126 and the right side surface 128. In such an embodiment, the contacts 102–114, 202–214 are placed substantially at the center of each face 116, 118, such that each card 100 can be inserted into the cavity 408 in any one of four different orientations.

The contacts on adjacent cards 100 engage one another in substantially the same manner described above for the engagement of connectors between the card 100 adjacent the first wall and the contacts 522–534 on the first wall 416. Each card 100 may be oriented relative to an adjacent card 100 in one of two directions, due to the rotational symmetry and consequent reversibility of each card 100. That is, the first face 116 of each card 100 may be oriented in the direction of either the first wall 416 or the second wall 418 of the cavity 408.

Because the only connections between adjacent cards 100 are made via the contacts 102–114, 202–214 on the faces 116, 118 of those cards 100, the cards 100 in the stack need not all have the same thickness. In this way, the use of cards having different thicknesses is facilitated. As an example, as shown in FIG. 6, a number of cards 100 having a first thickness are intermingled within a stack with one or more larger cards 602 and one or more still larger cards 600. The differing thicknesses of the cards 100, 600, 602 does not affect the operation of the cards 100 or the receiver 400, because interconnections are made between the faces 116, 118 of adjacent cards 100 regardless of their thickness. No thickness restriction is placed on the cards 100, allowing cards 100 to be made with different thicknesses to meet different needs or utilize different storage technologies.

Further, because interconnections are made between the faces 116, 118 of adjacent cards 100, an arbitrarily large number of cards 100 can be stacked together.

A controller 500 may be included in the receiver 400, if desired. The controller 500 is adapted to control the flow of data to and/or from the portable memory storage cards 100 stacked in the cavity 408, as described in greater detail below. An external connector 520 is connected to the controller 500, through which the controller 500 and the stack are connected to an external information handling system or other device. The external connector 520 may be a simple mechanical connector, or may include electronic components adapted to transmit data to and receive data from a remote information handling system. That is, the external connector 520 may include a modem, network interface card, or other communications interface hardware. The particular type of external connector 520 used is not critical to the invention. The controller 500 may be omitted, in which case the external connector 520 may be connected directly to the portable memory storage cards 100 via the contacts 522–534 on the first wall 416. In such a configuration, data is transmitted through the external connector 520 to or from an external information handling system adapted to record content to or play content back from the card or cards 100 in the receiver 400. The receiver 400 optionally may include other components used in receiving input from a user or providing output to a user, such as a display, a remote control sensor, a volume control, recording and playback controls, or other components. Such components are standard.

Figure 7:
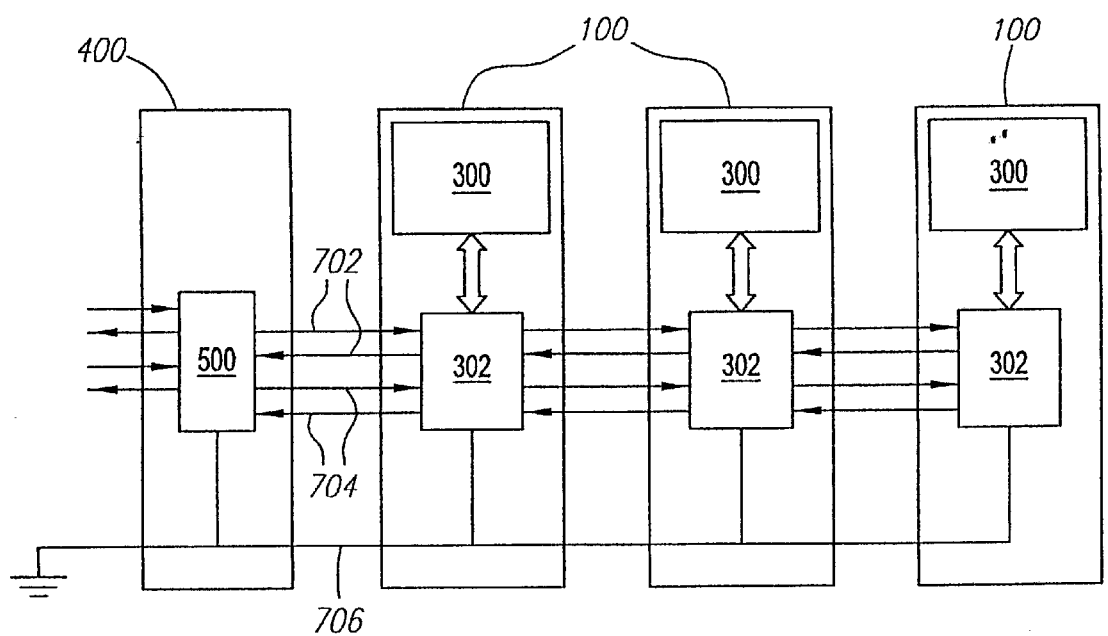
FIG. 7 is a block diagram of the connections between stacked portable memory cards and the receiver.

Referring as well to FIG. 7, a block diagram of a data bus 702, power loop 704 and common ground 706 through the stack of cards 100 is shown. By stacking the cards 100 between the first wall 416 and the retainer 504, a data bus 702 is formed through the cards 100, the data bus 702 extending through the data contacts 522, 524, 532, 534 in the first wall 416 to the controller 500 and/or the external connector 520. The cards 100 electrically touch each other to form the data bus 702. Data contacts 522, 524, 532, 534 are provided at one place in the cavity 408—the first wall 416—to connect the receiver 400 to the data bus 702 formed by the stack of cards 100. By using a single set of contacts 522, 524, 532, 534 to transmit data to and from the stack, the cost and complexity of the receiver 400 are minimized. Data can be transmitted across the data bus 702 using any appropriate protocol; the particular bus protocols utilized are not critical to the invention. In one embodiment, each card 100 drives signals to and receives signals from the two adjacent cards 100. By doing so, load requirements are minimized. Because of the very short distance between cards, a high clock rate can be used to send data between them. A high clock rate allows for the use of a small number of pins, and provides for bus viability. As an example, in one embodiment the data bus 702 has a clock rate that supports data rates associated with the transmission and storage of high-definition television (HDTV) signals. In one embodiment, the electrical interface module 302 includes a buffer, and signals traversing each card 100 are buffered through the electrical interface module 302 in each card, where data is transferred between cards 100 using a first-in, first-out (FIFO) order. In this way, bus loading is low and constrained. Other bus protocols or methods of operation may be used, if desired. The data transmitted across the data bus 702 may include the memory address to be accessed, data to be stored to or that has been retrieved from that memory address, control information, and other information relevant to the storage of information in or the retrieval of information from one or more cards 100.

The stack of cards 100 also forms a power loop 704 through the cards 100, which extends through the power contacts 526, 530 on the first wall to the controller 500, the external connector 520, and/or a power supply. The cards 100 electrically touch one another to form the power loop 704. Power contacts 526, 530 are provided at one place in the cavity 408—the first wall 416—to connect the receiver 400 to the power loop 704 formed by the stack of cards 100. In one embodiment, the power loop 704 is connected to the electrical interface module 302 of each card 100, which in turn provides power to the associated memory storage unit 300. In one embodiment, the power contacts 106, 110, 206, 210 are straight through on each card 100, meaning that they act as direct wires through each card 100. Current is thus provided to each card 100 via the power loop that passes through all cards 100 in the stack. In one embodiment, the retainer 504 includes a conductor adapted to connect to both the power contacts 206, 210 on the second face 118 of the card 100 adjacent the retainer 504, in order to complete the power loop 704. As a result, no switching is required within the cards 100, simplifying their construction. In another embodiment, the card 100 adjacent the retainer 504 completes the power loop 704, as shown. That is, circuitry (not shown) within the card 100 switches a conductor within the card 100 such that current flows from one power contact 106 on the first face 116 of the card 100 to the other power contact 110 on the first face 116 of the card 100, thereby completing the power loop 704.

The stack of cards 100 also forms a common ground 706 through the cards 100, which extends through the ground contact 528 on the first wall 416 of the cavity 408. The cards 100 in the stack touch one another to form the common ground 706. The ground contact 528 is provided at one place in the cavity 408—the first wall 416—to connect the receiver 400 to the common ground 706 formed by the stack of cards 100. In one embodiment, the common ground 706 is connected to the memory storage unit 300 within each card 100. In this way, substantially the same ground level is provided to each card 100, and is available for use in logic operations by the memory storage unit 300 and the electrical interface module 302, as well as other circuitry that may be present within the card 100.

In one embodiment, the cavity 408 is sized to hold a number of cards 100. The cards 100 are electrically connected to the receiver 400 while they are stored, and the content stored in the memory storage unit 300 in each card 100 is accessible to a user via the receiver 400. That is, the cards 100 are all accessible via the data bus 702 while stacked within the cavity 408. Thus, the receiver 400 functions as both a storage device and a media player at the same time. In this way, the receiver 400 can hold, for example, a person's music collection, while allowing a user to play music stored in the cards 100 in the cavity 408. The receiver 400 may be utilized in a number of locations or for a number of applications. The receiver 400 may be a standalone device, or may be integrated into another device such as an information handling system, car stereo, portable stereo, digital camera, portable digital assistant, wireless telephone, laptop computer, or other device. Where the receiver 400 is integrated into another device, the controller 500 and/or the external connector 520 may be omitted or integrated into the structure of the device hosting the receiver 400. As one example, the receiver 400 may be connected to an audio amplifier as a component of a home entertainment system, such that music stored within cards 100 that in turn are stored in the cavity 408 can be played back through the home entertainment system. As another example, the receiver 400 may be part of a home theater system, such that movies or video stored within cards 100 that in turn are stored in the cavity 408 can be played back through the home entertainment system. As another example, the receiver 400 may be integrated into the dashboard of an automobile as part of an automobile audio system, such that music stored within cards 100 that in turn are stored in the cavity 408 can be played back through the automobile audio system. As another example, the receiver 400 may be connected to an information handling system such as a personal computer, such that software stored within cards 100 that in turn are stored in the cavity 408 can be accessed by that information handling system. In another example, the information handling system writes data to one or more of the cards 100 stored in the cavity 408. As another example, the receiver 400 is connected to an information handling system, such that photographic data captured with a digital camera and stored in cards stored within the cavity 408 can be viewed using the information handling system. As another example, the receiver 400 is connected to an information handling system, such that video game software stored in cards stored within the cavity 408 can be played using the information handling system. As another example, the receiver 400 may be adapted to hold a single card 100, and may be adapted to form part of a light and durable portable music system having no moving parts associated with the playback of music.

Figure 8:
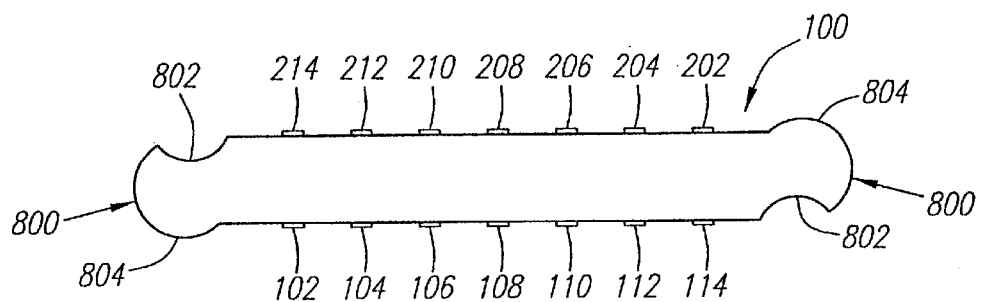
FIG. 8 is an end view of an embodiment of a portable memory storage card having alignment grooves.
Figure 9:
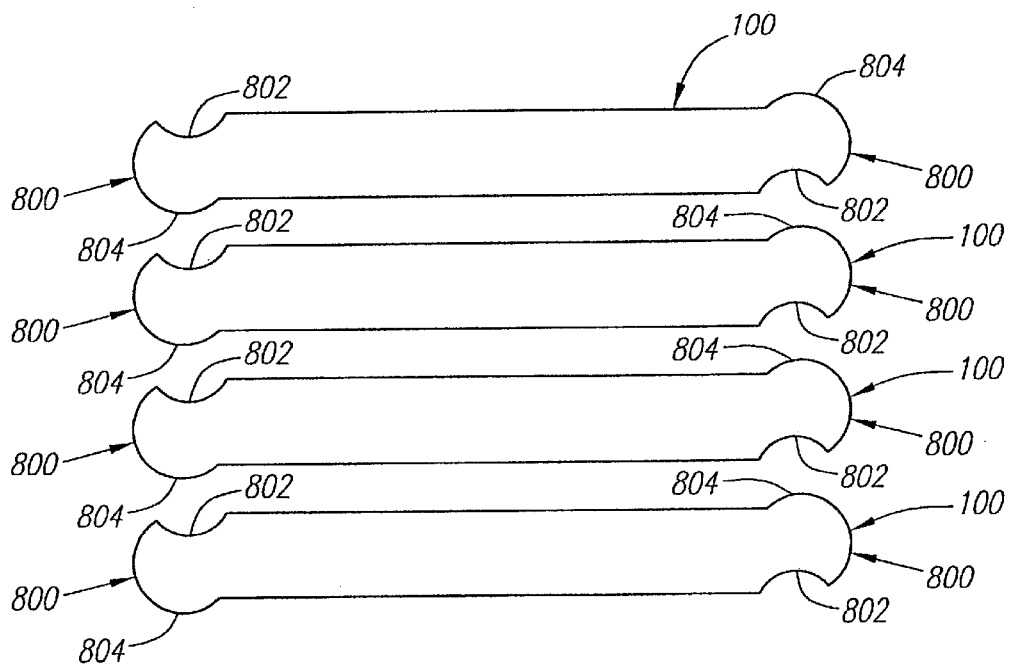
FIG. 9 is an end view of a number of portable memory storage cards having alignment grooves, stacked together.
Figure 10:
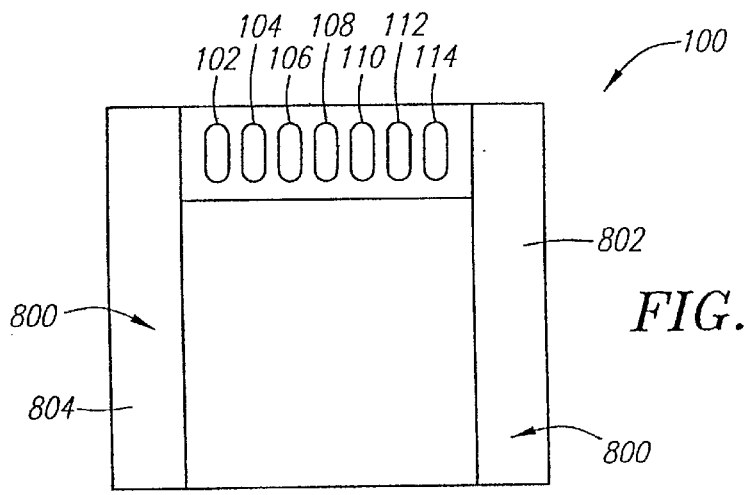
FIG. 10 is a front view of the embodiment of the portable memory storage card having alignment grooves.

Referring to FIGS. 8–10, a card 100 having alignment guides 800 is shown. One or more alignment guides 800 may be provided on each card 100 to facilitate the alignment of cards 100 stacked within the cavity 408. In one embodiment, each alignment guide 800 includes a groove 802 and an opposing ridge 804. In one embodiment, two alignment guides 800 are provided on each card 100, at opposite sides of the card 100. For example, one alignment guide 800 maybe provided along the left side surface 126 of the card, and another alignment guide 800 may be provided along the right side surface 128 of the card. The alignment guide 800 along the left side surface 126 of the card 100 has a ridge 804 adjacent the first face 116 of the card 100, and a groove 802 adjacent the second face 118 of the card 100. The groove 802 preferably opens in the direction of the second face 118, and extends along the direction of insertion of the card 100 into the cavity 408. The alignment guide 800 along the right side surface 128 of the card 100 has a ridge 804 adjacent the second face 118 of the card 100, and a groove 802 adjacent the first face 116 of the card 100. This groove 802 preferably opens in the direction of the first face 116, and extends along the direction of insertion of the card 100 into the cavity 408. In this way, the card 100 is reversible. That is, it retains its rotational symmetry along a centerline that is substantially parallel to the first face 116 and second face 118 and substantially perpendicular to the top surface 122 and the bottom surface 124. In other words, that centerline is substantially parallel to the direction of insertion of the card 100 into the cavity 408, such that the card 100 can be inserted in either of two directions into the cavity 408. The alignment guides 800 may take other forms in other embodiments. For example, multiple discrete ridges 804 and corresponding grooves 802 may be utilized. As another example, in place of ridges 804, one or more convex dimples may be provided on the card 100, and in place of grooves 802, one or more concave divots may be provided on the card 100.

The alignment guides 800 facilitate the alignment of cards 100 relative to one another in the cavity 408. When two cards 100 are stacked together, the ridge 804 of the first card fits into the corresponding groove 802 in the second card, and the ridge 804 of the first card fits into the corresponding groove 802 in the first card. The ridge 804 is constructed to fit into the groove 802 of another card. Thus, the grooves 802 and ridges 804 interlock with one another. The interlocking ridges 804 and grooves 802 reduce motion of adjacent cards 100 in the direction that is substantially perpendicular to the grooves 802 and substantially parallel to the faces 116, 118 of the cards 100. In this way, the alignment guides 800 assist in aligning the contacts 102–114, 202–214 between adjacent cards. Because the groove 802 of each alignment guide 800 is oriented substantially along the direction of insertion of a card 100 into the cavity 408, a card 100 can be inserted into the stack, or removed from the stack, substantially without interference.

Where other embodiment of alignment guides 800 are used, they correspond in a similar manner, such that an alignment guide 800 on one card 100 fits into, mates with or otherwise acts in concert with the alignment guide 800 on an adjacent card 100 to align and stabilize the cards 100. For example, where dimples and divots are used as alignment guides 800, the one or more dimples on one card 100 fit are adapted to fit into the corresponding one or more divots on the adjacent card 100.

In another embodiment, one or more additional alignment guides (not shown) may be provided along another dimension of the card 100, to provide added stability to a stack of cards 100.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A portable memory card, comprising:
    a body having a first face and an opposite second face;
    a memory storage unit within said body;
    at least one contact on each of said first face and said second face electrically connected to said memory storage unit; and
    at least one alignment guide defined in said body, wherein said alignment guide comprises:
       a substantially linear groove; and
       a substantially linear ridge opposite said groove.

2. The card of claim 1, further comprising an electrical interface module between and electrically connected to said memory storage unit and said at least one connector.

3. The card of claim 2, wherein said electrical interface module is a buffer.

4. The card of claim 1, wherein said first face and said second face of said body are substantially parallel to one another.

5. The card of claim 1, further comprising
    at least one power contact on each of said first face and said second face electrically connected to said memory storage unit; and
    at least one ground contact on each of said first face and said second face electrically connected to said memory storage unit.

6. The card of claim 5, wherein the portable memory card is rotationally symmetrical.

7. The card of claim 1, wherein said contacts on said first face are raised and said contacts on said second face are depressed.

8. A portable memory card comprising:
a body having a first face and an opposite second face;
a memory storage unit within said body;
at least one contact on each of said first face and said second face electrically connected to said memory storage unit; and
two alignment guides defined in said body, wherein each said alignment guide comprises a substantially linear groove and a substantially linear ridge opposite said groove, and wherein said alignment guides are oriented opposite to one another, whereby the groove of one alignment guide faces substantially the opposite direction from the groove of the other alignment guide.

9. A system for storing and accessing portable memory cards, comprising:
a receiver, comprising
a cavity adapted to receive a plurality of portable memory cards, said cavity having a wall; and
a plurality of contacts on said wall; and
a plurality of portable memory cards stacked within said cavity, each said card comprising
a body having face and an opposite second face,
a memory storage unit within said body,
a buffer electrically connected to said memory storage unit, and
at least one contact on each of said first face and said second face electrically connected to said memory storage unit via said buffer;
wherein one said portable memory card in said cavity is adjacent to said cavity wall and electrically connected to said plurality of contracts on said cavity wall; and
wherein said stacked portable memory cards form a data bus connected to said contacts on said cavity wall.

10. The system of claim 9, wherein said portable memory cards have two or more different thickness.

11. The system of claim 9, wherein each portable memory card is rotationally symmetrical, whereby each portable memory card may be inserted into said cavity in one of at least two different orientations.

12. The system of claim 9, wherein each portable memory card further comprises at least one alignment guide on each said face, and wherein adjacent said portable memory cards in said stack interlock with one another via said alignment guides.

13. The system of claim 9, further comprising a retainer extending into said cavity, said retainer biasing said stack against said cavity wall.

14. The system of claim 9, wherein each said contact flexes toward said body of said contact on an adjacent portable memory card.

15. The system of claim 9, wherein each said contact is sufficiently flexible to move to a position substantially flush with the surface of said body when said contact touches another connector on an adjacent portable memory card.

16. A receiver for storing and accessing portable memory cards, each portable memory card including a body having a first face and a second face, a memory storage unit within said body, and at least one contact on each of said first face and said second face electrically connected to said memory storage unit, the receiver comprising:
a cavity adapted to receive a plurality of portable memory cards, said cavity having a wall,
at least one contact on said wall, said at least one contact positioned on said cavity wall to align with and engage the at least one contact of the portable memory card when the portable memory card is adjacent said wall; and
a retainer extending into said cavity, said retainer biasing at least one portable memory card against said cavity wall.

17. The receiver of claim 16, further comprising
a controller electrically connected to said at least one contact on said wall; and
an external connector electrically connected to said controller and adapted for connection to an external information handling system.

18. A method for storing portable memory cards in a receiver and accessing data within the portable memory cards, where each portable memory card includes at least one contact on each of two opposing faces, and where the receiver includes a cavity bounded by a cavity wall on which a plurality of contacts are located, the method comprising:
stacking a plurality of portable memory cards within the cavity, wherein the contacts on adjacent portable memory cards contact one another to form a data bus through the stacked cards;
biasing the stacked cards against the cavity wall, wherein the contacts on the portable memory card adjacent the cavity wall are aligned with and electrically connected to the contacts on the cavity wall to connect said data bus to the receiver; and
transmitting data through said data bus.

19. The method of claim 18, wherein contacts on adjacent portable memory cards contact one another to form a power loop; further comprising transmitting current through said power loop.

20. The method according to claim 18, further comprising
transmitting data across said data bus including a memory address to be accessed, data for storage and retrieval, and control information;
an external connector electrically connected to said controller and adapted for connection to an external information handling system.

21. A storage device, comprising:
a body having mutually opposing first and second faces;
a storage element enclosed within the body; and
at least one contact on the first face and at least one contact on the second face, the contacts being electrically connected to the storage device, the body and the contacts being configured so that a plurality of storage devices can be stacked face-to-face and the contacts for the plurality of storage devices touch to form a bus.

22. A content storage apparatus capable of storing and accessing a plurality of portable memory cards, the memory cards having mutually opposing first and second faces and contacts on the first and second faces, the memory cards and contacts being configured so that memory cards can be entered into the content storage apparatus and stacked face-to-face and the contacts of the entered memory cards touch to form a bus, the storage apparatus comprising:
a receiver comprising a plurality of walls that define a longitudinally extending interior cavity adapted to receive at least one portable memory card stacked along the longitudinal axis;
a retainer positioned within the cavity along the longitudinal axis and constraining the at least one stacked portable memory card against a wall of the receiver positioned along and perpendicular to the longitudinal axis so that the contacts of the at least one stacked portable memory card are in electrical contact; and
at least one contact coupled to the receiver and engaging the bus.

23. The apparatus according to claim 22, further comprising:
at least one contact coupled to the receiver and capable of coupling to a portion of the bus to form a power loop through the at least one stacked portable memory card.

24. The apparatus according to claim 22, further comprising:
at least one contact coupled to the receiver and capable of coupling to a portion of the bus to form a data bus through the at least one stacked portable memory card.

25. The apparatus according to claim 22, further comprising:
a contact coupled to the receiver and capable of coupling to a portion of the bus to form a common ground through the at least one stacked portable memory card.

26. The apparatus according to claim 22 wherein the apparatus is a device selected from among a group of devices comprising a storage device, a media player, a standalone device, an information handling system, a automotive audio system, a car stereo, a portable stereo, a digital camera, a portable digital assistant, a wireless telephone, a laptop computer, a home entertainment system, a home theatre system, and a personal computer.

* * * * *

UNITED STATES PATENT AND TRADEMARK OFFICE
CERTIFICATE OF CORRECTION

PATENT NO.         : 6,618,258 B2  
APPLICATION NO. : 09/853729  
DATED                  : September 9, 2003  
INVENTOR(S)        : Andrew C. Goris Page 1 of 1

It is certified that error appears in the above-identified patent and that said Letters Patent is hereby corrected as shown below:

Claim 9, Column 13, line 18, delete "wall;" and insert therefor --wall,--

Claim 9, Column 13, line 22, after "body having" insert --a first--

Claim 14, Column 13, line 49, after "body of said" insert --card when said contact touches another--

Claim 21, Column 14, line 44, delete "device," and insert the following:
   --device; and
      at least one alignment guide defined in the body and capable of aligning--

Claim 21, Column 14, line 45, delete "being configured"

Signed and Sealed this

Seventeenth Day of November, 2009

David J. Kappos  
*Director of the United States Patent and Trademark Office*